US009009419B2

(12) United States Patent
Asaro et al.

(10) Patent No.: US 9,009,419 B2
(45) Date of Patent: Apr. 14, 2015

(54) SHARED MEMORY SPACE IN A UNIFIED MEMORY MODEL

(75) Inventors: Anthony Asaro, Toronto (CA); Kevin Normoyle, Los Gatos, CA (US); Mark D. Hummel, Franklin, MA (US); Mark Fowler, Hopkinton, MA (US)

(73) Assignees: Advanced Micro Devices, Inc., Sunnyvale, CA (US); ATI Technologies ULC, Markham, Ontario (CA)

(*) Notice: Subject to any disclaimer, the term of this patent is extended or adjusted under 35 U.S.C. 154(b) by 316 days.

(21) Appl. No.: 13/562,985

(22) Filed: Jul. 31, 2012

(65) Prior Publication Data
US 2014/0040565 A1  Feb. 6, 2014

(51) Int. Cl.
*G06F 12/02* (2006.01)
*G06F 12/06* (2006.01)

(52) U.S. Cl.
CPC .......... *G06F 12/063* (2013.01); *G06F 12/0292* (2013.01); *G06F 12/06* (2013.01)

(58) Field of Classification Search
CPC . G06F 12/1072; G06F 12/109; G06F 9/5016; G06F 9/5077; G06F 13/1663; G06F 12/06; G06F 12/063; G06F 12/0292
See application file for complete search history.

(56) References Cited

U.S. PATENT DOCUMENTS

| | | | | |
|---|---|---|---|---|
| 8,531,471 B2 * | 9/2013 | Chen et al. | ..................... | 345/542 |
| 8,669,990 B2 * | 3/2014 | Sprangle et al. | ............... | 345/522 |
| 2004/0160449 A1 * | 8/2004 | Gossalia et al. | .............. | 345/543 |
| 2011/0153957 A1 * | 6/2011 | Gao et al. | ...................... | 711/147 |
| 2012/0254497 A1 * | 10/2012 | Ni et al. | ........................... | 711/6 |

* cited by examiner

*Primary Examiner* — Hiep Nguyen
(74) *Attorney, Agent, or Firm* — Volpe and Koenig, P.C.

(57) ABSTRACT

Methods and systems are provided for mapping a memory instruction to a shared memory address space in a computer arrangement having a CPU and an APD. A method includes receiving a memory instruction that refers to an address in the shared memory address space, mapping the memory instruction based on the address to a memory resource associated with either the CPU or the APD, and performing the memory instruction based on the mapping.

26 Claims, 10 Drawing Sheets

SHARED MEMORY SPACE IN A UNIFIED MEMORY MODEL

BACKGROUND

1. Field of the Invention

The present invention is generally directed to computer systems. More particularly, the present invention is directed to architecture and methods for unifying computational components of a computer system.

2. Background Art

The desire to use a graphics processing unit (GPU) for general computation has become much more pronounced recently due to the GPU's exemplary performance per unit power and/or cost. The computational capabilities for GPUs, generally, have grown at a rate exceeding that of the corresponding central processing unit (CPU) platforms. This growth, coupled with the explosion of the mobile computing market (e.g., notebooks, mobile smart phones, tablets, etc.) and its necessary supporting server/enterprise systems, has been used to provide a specified quality of desired user experience. Consequently, the combined use of CPUs and GPUs for executing workloads with data parallel content is becoming a volume technology.

However, GPUs have traditionally operated in a constrained programming environment, available primarily for the acceleration of graphics. These constraints arose from the fact that GPUs did not have as rich a programming ecosystem as CPUs. Their use, therefore, has been mostly limited to two dimensional (2D) and three dimensional (3D) graphics and a few leading edge multimedia applications, which are already accustomed to dealing with graphics and video application programming interfaces (APIs).

With the advent of multi-vendor supported OpenCL® and DirectCompute®, standard APIs and supporting tools, the limitations of the GPUs in traditional applications has been extended beyond traditional graphics. Although OpenCL and DirectCompute are a promising start, there are many hurdles remaining to creating an environment and ecosystem that allows the combination of a CPU and a GPU to be used as fluidly as the CPU for most programming tasks.

Existing computing systems often include multiple processing devices. For example, some computing systems include both a CPU and a GPU on separate chips (e.g., the CPU might be located on a motherboard and the GPU might be located on a graphics card) or in a single chip package. Both of these arrangements, however, still include significant challenges associated with (i) efficient scheduling, (ii) providing quality of service (QoS) guarantees between processes, (iii) programming model, (iv) compiling to multiple target instruction set architectures (ISAs), and (v) separate memory systems,—all while minimizing power consumption.

Many of the challenges associated with separate memory systems are minimized with the use of unified computing system environment. However, within the unified computing system environments APD's and CPUs are unable to efficiently access a shared physical memory and execute one or more instructions that reference this shared memory space.

SUMMARY OF THE EMBODIMENTS

What is needed, therefore, is a method and system providing a shared address memory space accessible by a CPU and an APD so that either the CPU or the APD physical memory can execute a memory instruction that refers to the shared address memory space.

Although GPUs, accelerated processing units (APUs), and general purpose use of the graphics processing unit (GPGPU), are commonly used terms in this field, the expression "accelerated processing device (APD)" is considered to be a broader expression. For example, APD refers to any cooperating collection of hardware and/or software that performs those functions and computations associated with accelerating graphics processing tasks, data parallel tasks, or nested data parallel tasks in an accelerated manner compared to conventional CPUs, conventional GPUs, software and/or combinations thereof. APD's combine heterogeneous (i.e., dissimilar) processors (e.g. CPUs, GPUs, DSPs, etc.) into a singular system. Such singular systems may include, as noted herein, multiple separate devices or a singular device which incorporates the dissimilar processors into one package or one semiconductor/integrated circuit.

Embodiments of the present invention provide, under certain circumstances, a method of mapping a memory instruction to a shared memory address space in a computer arrangement configured for unified operation between a CPU and an APD. The method includes receiving the memory instruction from an application, wherein the memory instruction refers to an address in the shared memory address space and mapping the memory instruction to a memory resource based on the address, wherein the memory resource is associated with at least one of the CPU and the APD. Information corresponding to the mapping is sent by a memory instruction mapper to the CPU or the APD, where the memory instruction is performed by the CPU or the APD based on the mapping.

Additional features and advantages of the present invention, as well as the structure and operation of various embodiments of the present invention, are described in detail below with reference to the accompanying drawings. It is noted that the present invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate the present invention and, together with the description, further serve to explain the principles of the present invention and to enable a person skilled in the pertinent art to make and use the present invention. Various embodiments of the present invention are described below with reference to the drawings, wherein like reference numerals are used to refer to like elements throughout.

DETAILED DESCRIPTION OF EMBODIMENTS OF THE INVENTION

In the detailed description that follows, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The term "embodiments of the invention" does not require that all embodiments of the invention include the discussed feature, advantage or mode of operation. Alternate embodiments may be devised without departing from the scope of the invention, and well-known elements of the invention may not be described in detail or may be omitted so as not to obscure the relevant details of the invention. In addition, the terminology used herein is for the purpose of describing particular embodiments only and is not intended to be limiting of the invention. For example, as used herein, the singular forms "a", "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Figure 1A:
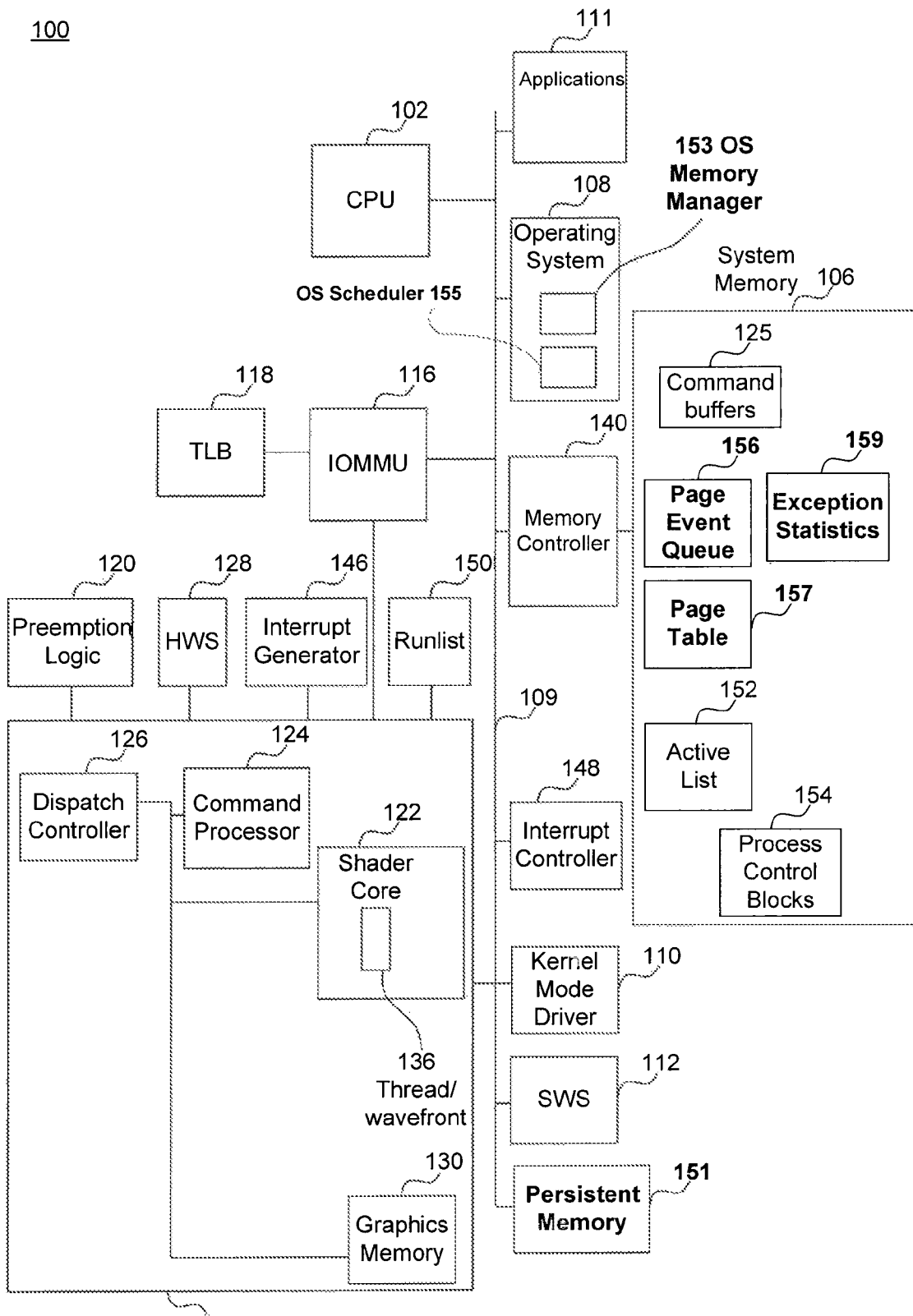
FIG. 1A is a block diagram of an embodiment of a processing system in accordance with the present invention.

FIG. 1A is a block diagram of an exemplary unified computing system 100 that includes a CPU 102 and an APD 104. In an embodiment of the present invention, the system 100 is formed on a single silicon die, combining the CPU 102 and APD 104 to provide a unified programming and execution environment. This environment enables the APD to be used as fluidly as the CPU for some programming tasks. However, it is not an absolute requirement of this invention that the CPU and APD be formed on a single silicon die. In some embodiments, they may be formed separately and be mounted on the same or different substrates.

In one example, system 100 also includes a system memory 106, an operating system (OS) 108, and a communication infrastructure 109. The OS 108 and the communication infrastructure 109 are described in greater detail below.

The system 100 also includes a kernel mode driver (KMD) 110, a software scheduler (SWS) 112, and a memory management unit, such as input/output memory management unit (IOMMU) 116. CPU 102 and APD 104 can be implemented on a single integrated circuit chip or on multiple chips. A person skilled in the relevant art will appreciate that system 100 may include one or more software, hardware, and firmware components in addition to, or different from, that shown in the embodiment shown in FIG. 1A.

CPU 102 can include (not shown) one or more of a control processor, field programmable gate array (FPGA), application specific integrated circuit (ASIC), or digital signal processor (DSP). CPU 102, for example, executes the control logic, including the OS 108, KMD 110, SWS 112, and applications 111, that control the operation of computing system 100. In this illustrative embodiment, CPU 102, according to one embodiment, initiates and controls the execution of applications 111 by, for example, distributing the processing associated with that application across the CPU 102 and other processing resources, such as the APD 104. CPU 102 can include one or more single or multi core CPUs.

APD 104 includes its own compute units (not shown), such as, but not limited to, one or more single instruction multiple data (SIMD) processing cores. Each APD compute unit can include one or more of scalar and/or vector floating-point units and/or arithmetic and logic units (ALU). The APD compute unit can also include special purpose processing units (not shown) such as inverse-square root units and sine/cosine units. The APD compute units are referred to herein collectively as shader core 122.

Having one or more SIMD compute units, in general, makes APD 104 ideally suited for execution of data-parallel tasks such as are common in graphics processing.

A set of related operations executed on a compute unit can also be referred to as a compute kernel. In graphics pipeline operations, such as pixel processing, and other parallel computation operations, can require that the same instruction stream or compute kernel can be performed on streams or collections of input data elements. Respective instantiations of the same compute kernel can be executed concurrently on multiple compute units in shader core 122 in order to process such data elements in parallel. A single data item within a stream or collection to which a compute kernel is applied is referred to as a work-item. A set of work-items across which the instructions of a compute kernel are applied in lock-step within a single SIMD processing core is referred to as a thread. Stated another way, the term thread refers to a single instance of a program execution with a unique data state.

In an illustrative embodiment, each compute unit (e.g., SIMD processing core) can execute a respective instantiation of a particular thread or process to process incoming data.

A group of threads that are processed under a shared instruction state in a SIMD-style process are referred to as a wavefront. For example, shader core 122 can simultaneously execute a predetermined number of wavefronts 136, each wavefront 136 comprising a predetermined number of threads.

APD 104 includes its own memory, such as graphics memory 130. Graphics memory 130 provides a local memory for use during computations in APD 104, and each compute unit of the shader core 122 may have its own local data store (not shown). In one embodiment, APD 104 can include access to local graphics memory 130, as well as access to the system memory 106. In another embodiment, APD 104 can also include access to dynamic random access memory (DRAM)

or other such memories attached directly to the APD separately from system memory 106.

APD 104 also includes a command processor (CP) 124. CP 124 controls the processing within APD 104. CP 124 also retrieves instructions to be executed from command buffers 125 in system memory 106 and coordinates the execution of those instructions on APD 104.

In one example, CPU 102 inputs commands based on applications 111 into appropriate command buffers 125. A plurality of command buffers 125 can be maintained with each process scheduled for execution on the APD having its own command buffer 125.

Command processor 124 can be implemented in hardware, firmware, or software, or a combination thereof. In one embodiment, command processor 124 is implemented as a RISC engine with microcode for implementing logic including scheduling logic.

APD 104 may also include a dispatch controller 126. Dispatch controller 126 includes logic to initiate threads and wavefronts in the shader core. In some embodiments, dispatch controller 126 can be implemented as part of command processor 124.

System 100 also includes a hardware scheduler (HWS) 128 for selecting a process from a run list 150 for execution on APD 104. HWS 128 can select processes from run list 150 using round robin methodology, based upon priority level, or based on other scheduling policies. By way of example, the priority level can be dynamically determined. HWS 128 can also include functionality to manage the run list, for example, by adding new processes and by deleting existing processes from a run-list. The run list management logic of HWS 128 is sometimes referred to as a run list controller (RLC).

In various embodiments of the present invention, when HWS 128 initiates the execution of a process from run list 150, CP 124 begins retrieving and executing instructions from the corresponding command buffer 125. In some instances, command processor 124 can generate one or more commands to be executed within APD 104, which correspond with each command received from CPU 102. In one embodiment, command processor 124, together with other components, implements a prioritizing and scheduling of commands on APD 104 in a manner that improves or maximizes the utilization of the resources of APD 104 resources and/or system 100.

APD 104 can have access to, or may include, an interrupt generator 146. Interrupt generator 146 can be configured by APD 104 to interrupt the OS when interrupt events, such as page faults, are encountered by APD 104. For example, APD 104 can rely on interrupt generation logic within IOMMU 116 to create the page fault interrupts noted above.

APD 104 can also include preemption and context switch logic 120, which includes logic to preempt a process currently running within shader core 122. More specifically, context switch logic 120 can include functionality to coordinate the preemption, for example, by stopping the process and saving the current state of the process (e.g., shader core 122 state, CP 124 state).

Preemption and context switch logic 120 can also include logic to context switch another process into the APD 104. The functionality to context switch another process into running on the APD 104 may include instantiating the process, for example, through the command processor and dispatch controller to run on APD 104, restoring any previously saved state for that process, and starting its execution.

System memory 106 includes non-persistent memory such as DRAM. System memory 106 can store, e.g., processing logic instructions, constant values, and variable values during execution of portions of applications or other processing logic. For example, in one embodiment, parts of control logic to perform one or more operations on CPU 102 can reside within system memory 106 during execution of the respective portions of the operation by CPU 102. The term "processing logic" or "logic," as used herein, refer to control flow instructions, instructions for performing computations, and instructions for associated access to resources.

During execution, respective applications, OS functions, processing logic instructions, and system software can reside in system memory 106. Control logic instructions fundamental to OS 108 will generally reside in system memory 106 during execution. Other software instructions, including, for example, kernel mode driver 110 and software scheduler 112 can also reside in system memory 106 during execution of system 100.

System memory 106 includes command buffers 125 that are used by CPU 102 to send commands to APD 104. System memory 106 also contains process lists and process information (e.g., active list 152 and process control blocks 154). These lists, as well as the information, are used by scheduling software executing on CPU 102 to communicate scheduling information to APD 104 and/or related scheduling hardware. Access to system memory 106 can be managed by a memory controller 140, which is coupled to system memory 106. For example, requests from CPU 102, or from other devices, for reading from or for writing to system memory 106 are managed by the memory controller 140.

IOMMU 116 is a multi-context memory management unit. IOMMU 116 includes logic to perform virtual to physical address translation for memory page access for devices including APD 104. IOMMU 116 may also include logic to generate interrupts, for example, when a page access by a device such as APD 104 results in a page fault. IOMMU 116 may also include, or have access to, a translation lookaside buffer (TLB) 118. TLB 118, as an example, can be implemented in a content addressable memory (CAM) to accelerate translation of logical (i.e., virtual) memory addresses to physical memory addresses for requests made by APD 104 for data in system memory 106.

Communication infrastructure 109 interconnects the components of system 100 as needed. Communication infrastructure 109 can include (not shown) one or more of a Peripheral Component Interconnect (PCI) bus, extended PCI (PCI-E) bus, Advanced Microcontroller Bus Architecture (AMBA) bus, Advanced Graphics Port (AGP), or such communication infrastructure. Communications infrastructure 109 can also include an Ethernet, or similar network, or any suitable physical communications infrastructure that satisfies an application's data transfer rate requirements. Communication infrastructure 109 includes the functionality to interconnect components including components of computing system 100.

OS 108 includes components and software/firmware providing functionality to manage the hardware components of system 100 and to provide common services. In various embodiments, processes defined by OS 108 can execute on CPU 102 and provide common services. These common services can include, for example, scheduling applications for execution within CPU 102, fault management, interrupt service, as well as processing the input and output of other applications.

In various embodiments, based on interrupts generated by an interrupt controller such as interrupt controller 148, OS 108 invokes an appropriate interrupt handling routine. For example, upon detecting a page fault interrupt, OS 108 may invoke an interrupt handler to initiate loading of the relevant page into system memory 106 and to update corresponding page tables.

OS 108 is configured to have functionality to protect system 100 by ensuring that access to hardware components is mediated through OS managed kernel functionality. In effect, OS 108 ensures that applications, such as applications 111, run on CPU 102 in user space. OS 108 also ensures that applications 111 invoke kernel functionality provided by the OS to access hardware and/or input/output functionality. According to an embodiment of the present invention, the OS includes an OS memory manager 153 and an OS scheduler 155. OS memory manager 153 has the functionality required to manage memory objects such as, but not limited to, page tables 157 and page event queues 158. Page tables 157 are tables that indicate the location of pages currently loaded in memory. Page event queue 158 is a queue in which page related events, such as page fault events, are enqueued by other devices, such as IOMMU 116, in order to communicate page related information to the OS. OS scheduler 155 includes the functionality, according to an embodiment, to determine the status of page faults and to determine if a GPU context switch should be initiated in response to a page fault.

By way of example, applications 111 include various programs or instructions to perform user computations which are also executed on CPU 102. The unification concepts of embodiments of this invention enable, in certain circumstances, CPU 102 to seamlessly send selected instructions for processing on the APD 104. Under this unified APD/CPU framework, input/output requests from applications 111 will be processed through corresponding OS functionality.

KMD 110 implements an application program interface (API) through which CPU 102, or applications executing on CPU 102 or other logic, can invoke APD 104 functionality. For example, KMD 110 can enqueue commands from CPU 102 to command buffers 125 from which APD 104 will subsequently retrieve the commands. Additionally, KMD 110 can, together with SWS 112, perform scheduling of processes to be executed on APD 104. SWS 112, for example, can include logic to maintain a prioritized list of processes to be executed on the APD.

In other embodiments of the present invention, applications executing on CPU 102 can entirely bypass KMD 110 when enqueuing commands.

In some embodiments, SWS 112 maintains an active list 152 in system memory 106 of processes to be executed on APD 104. SWS 112 also selects a subset of the processes in active list 152 to be managed by HWS 128 in the hardware. In an illustrative embodiment, this two level run list of processes increases the flexibility of managing processes and enables the hardware to rapidly respond to changes in the processing environment. In another embodiment, information relevant for running each process on APD 104 is communicated from CPU 102 to APD 104 through process control blocks (PCB) 154.

Processing logic for applications, OS, and system software can include instructions specified in a programming language such as C and/or in a hardware description language such as Verilog, RTL, or netlists, to enable ultimately configuring a manufacturing process through the generation of maskworks/photomasks to generate a hardware device embodying aspects of the present invention described herein.

A person skilled in the relevant art will understand, upon reading this description, that computing system 100 can include more or fewer components than shown in FIG. 1A. For example, computing system 100 can include one or more input interfaces, non-volatile storage, one or more output interfaces, network interfaces, and one or more displays or display interfaces.

Figure 1B:
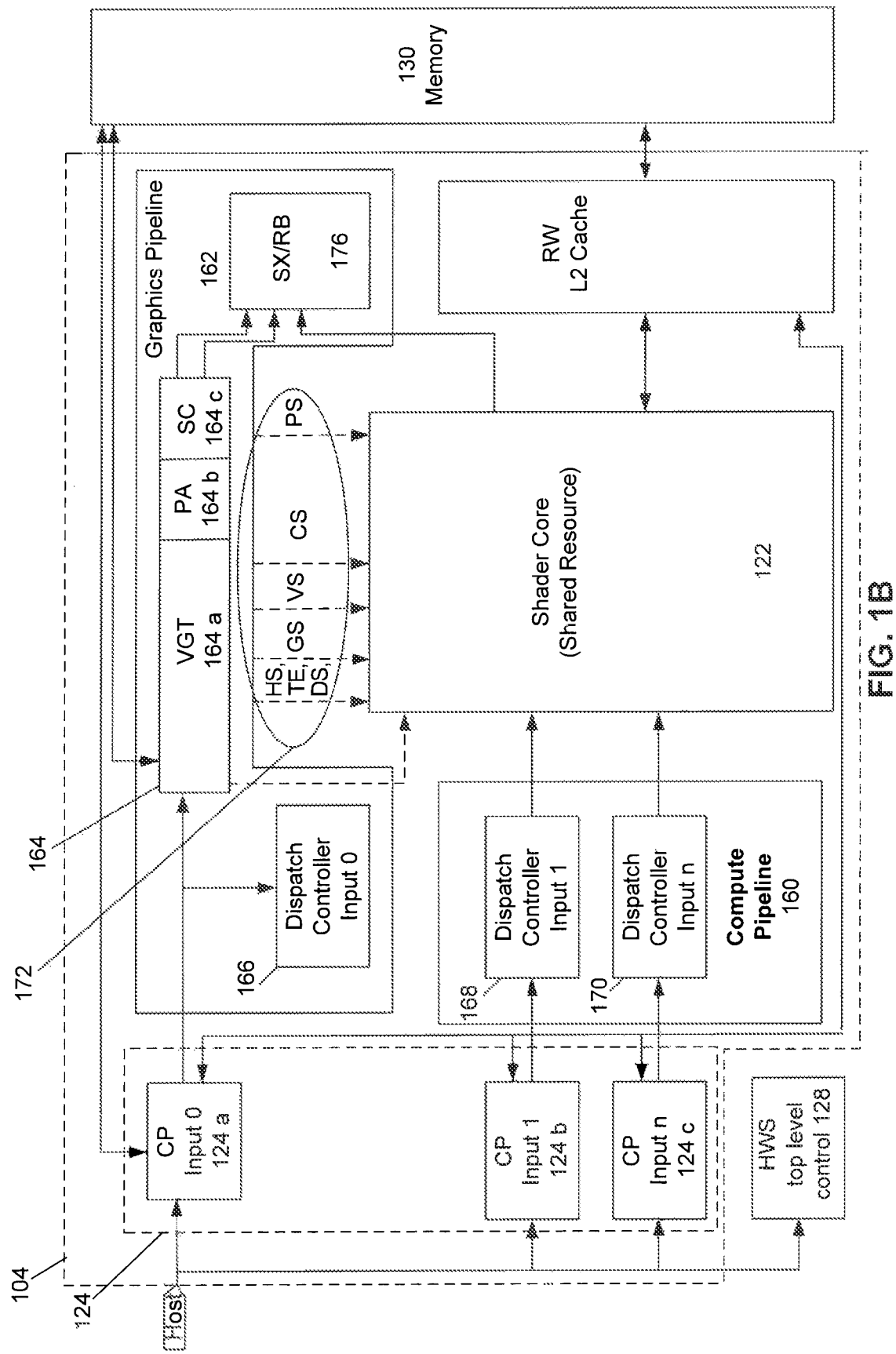
FIG. 1B is a block diagram of APD 104 shown in FIG. 1A.

FIG. 1B is an embodiment showing a more detailed illustration of APD 104 shown in FIG. 1A. In FIG. 1B, CP 124 can include CP pipelines 124a, 124b, and 124c. CP 124 can be configured to process the command lists that are provided as inputs from command buffers 125, shown in FIG. 1A. In the exemplary operation of FIG. 1B, CP input 0 (124a) is responsible for driving commands into a graphics pipeline 162. CP inputs 1 and 2 (124b and 124c) forward commands to a compute pipeline 160. Also provided is a controller mechanism 166 for controlling operation of HWS 128.

In FIG. 1B, graphics pipeline 162 can include a set of blocks, referred to herein as ordered pipeline 164. As an example, ordered pipeline 164 includes a vertex group translator (VGT) 164a, a primitive assembler (PA) 164b, a scan converter (SC) 164c, and a shader-export, render-back unit (SX/RB) 176. Each block within ordered pipeline 164 may represent a different stage of graphics processing within graphics pipeline 162. Ordered pipeline 164 can be a fixed function hardware pipeline. Other implementations can be used that would also be within the spirit and scope of the present invention.

Although only a small amount of data may be provided as an input to graphics pipeline 162, this data will be amplified by the time it is provided as an output from graphics pipeline 162. Graphics pipeline 162 also includes DC 166 for counting through ranges within work-item groups received from CP pipeline 124a. Compute work submitted through DC 166 is semi-synchronous with graphics pipeline 162.

Compute pipeline 160 includes shader DCs 168 and 170. Each of the DCs 168 and 170 is configured to count through compute ranges within work groups received from CP pipelines 124b and 124c.

The DCs 166, 168, and 170, illustrated in FIG. 1B, receive the input ranges, break the ranges down into workgroups, and then forward the workgroups to shader core 122.

Since graphics pipeline 162 is generally a fixed function pipeline, it is difficult to save and restore its state, and as a result, the graphics pipeline 162 is difficult to context switch. Therefore, in most cases context switching, as discussed herein, does not pertain to context switching among graphics processes. An exception is for graphics work in shader core 122, which can be context switched.

After the processing of work within graphics pipeline 162 has been completed, the completed work is processed through a render back unit 176, which does depth and color calculations, and then writes its final results to memory 130.

Shader core 122 can be shared by graphics pipeline 162 and compute pipeline 160. Shader core 122 can be a general processor configured to run wavefronts. In one example, all work within compute pipeline 160 is processed within shader core 122. Shader core 122 runs programmable software code and includes various forms of data, such as state data.

Figure 2:
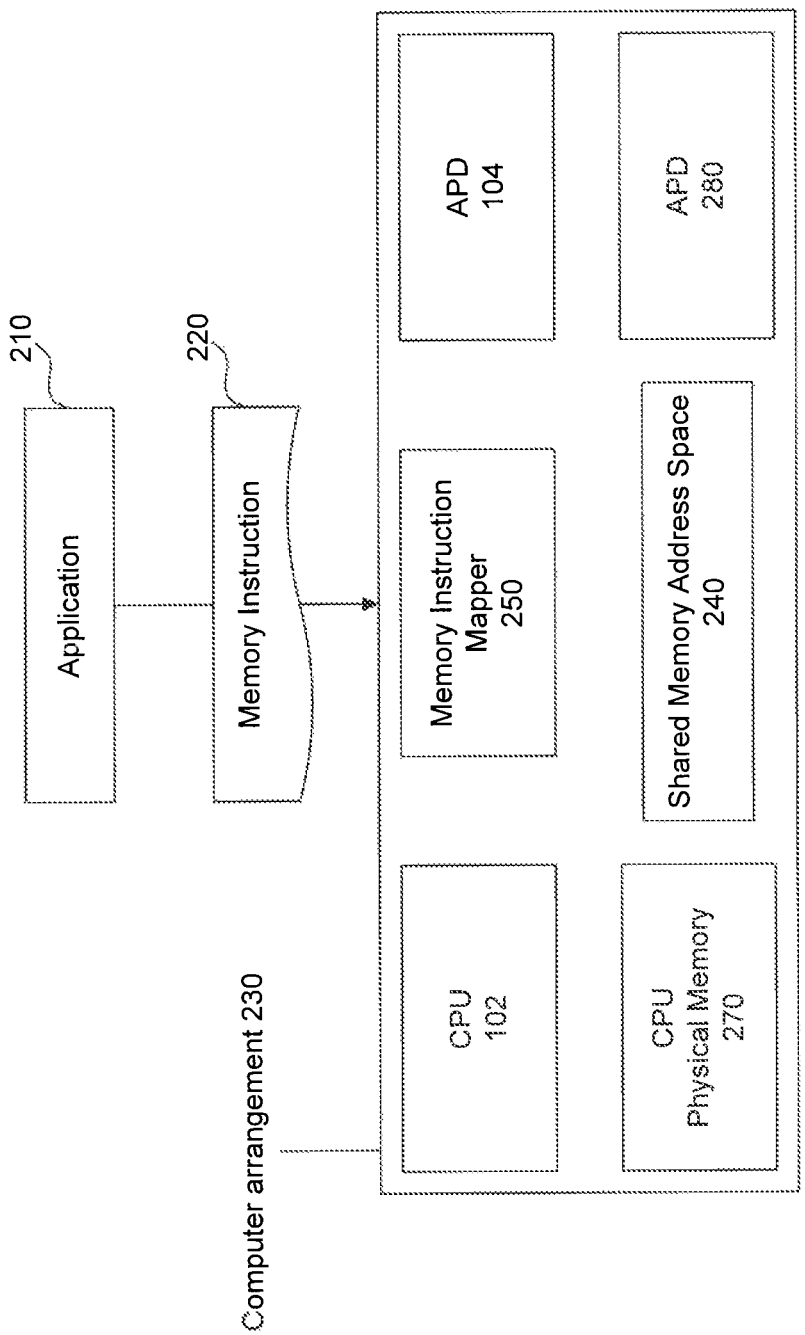
FIG. 2 depicts a system of performing a memory instruction using a memory instruction mapper and a shared memory address space, according to an embodiment of the present invention.

FIG. 2 is a block diagram of an exemplary system 200 in which embodiments of the present invention, or portions thereof, can be implemented. System 200 includes an application 210 and computer arrangement 230. Computer arrangement 230 includes CPU 102, memory instruction mapper 250, APD 104, shared memory address space 240, CPU physical memory 270 and APD physical memory 280. Application 210 generates memory instruction 220, such instruction transferred to computer arrangement 230 for execution.

Generally speaking, some embodiments described herein use memory instruction mapper 250 and shared memory address space 240 to map memory instructions generated by CPU 102 and APD 104 to physical memory resources. As noted with the description of FIG. 1A above, in an embodiment, portions of both the CPU and APD physical memory are available for use by memory instructions. For example, using approaches detailed herein, a CPU thread is not limited to only accessing CPU physical memory. A memory instruction running on a APD thread is also not limited to only accessing APD physical memory 280.

As noted in the description of FIG. 1A, one approach to enabling the sharing of physical memory detailed above, uses a shared memory address space to access different physical memory resources. For example, rather than having an application use the conventional approach of explicitly marshalling memory between a CPU virtual address space and a APD virtual address space the shared memory address space described herein can be used. An application using both a CPU and a APD for execution, can have both CPU and APD memory instructions accessing the same shared memory address space.

One approach to enabling the shared memory address space 240 detailed herein is to use a memory instruction mapper 250 to map an instruction to a physical memory (CPU or APD) based on the shared memory address referenced. For example, in a shared memory address space 240 having addresses from 0-99, the memory instruction mapper 250 can be configured to map addresses 0-49 to a CPU physical memory 270 and addresses 50-99 to an APD physical memory 280.

According to a conventional approach to enable a use of physical memories as described above, a memory instruction is copied and transferred from one physical memory portion to another, pre-allocated physical memory portion. After processing, results are transferred back to an accessible memory portion. In contrast to this conventional copy and transfer approach, embodiments of the present invention describe a memory instruction mapping system and method.

In an embodiment, application 210 generates memory instruction 220. As noted above in the description of FIG. 1A, embodiments of the present invention allow applications to utilize both CPU 102 and APD 104 in parallel, using parallel programming techniques. In a non-limiting, illustrative example, application 210 is written in C++ or other high-level x86-64 programming language.

In embodiments, memory instruction 220 originates in either an APD 104 thread or a CPU 102 thread. One example of an APD thread is used in application 210, where application 210 is a graphics-based application. One example of a CPU thread is used in application 210, where application 210 is a compute-based application. In a conventional approach, memory instruction 220 operating on a CPU thread would be executed by CPU 102 while, memory instruction 220 operating on an APD thread would be executed by APD 104. In contrast to this conventional approach, in embodiments using the shared memory address approaches described herein, memory instruction 220 can be executed by either APD 104 or CPU 102 regardless of from which thread memory instruction 220 originated.

In an embodiment, memory instruction 220 is mapped by memory instruction mapper 250 into CPU physical memory 270 or APD physical memory 280. Memory instruction 220 references an address in shared memory address space 240. Based on the address referenced by memory instruction 220 in shared memory address space 240, memory instruction mapper 250 maps memory instruction 220 to either CPU 102 or APD 104 to execute memory instruction 220.

Memory instruction 220 references an address in shared memory address space 240 that requires the execution of memory instruction 220 by APD 104. In another embodiment, memory instruction 220 references an address in shared memory address space 240 that requires the execution of memory instruction 220 by CPU 102. In another embodiment, memory instruction 220 references an address in shared memory address space 240 that allows execution of memory instruction 220 by either CPU 102 or APD 104. As would be appreciated by one having skill in the relevant art(s), given the description herein, shared memory address space 240 allows, for example, a pointer in application 210 to access both CPU physical memory 270 and APD physical memory 280 in shared memory address space 240. In application 210, a pointer that references shared memory address space 240 resolves to the same physical memory address regardless of whether CPU 102 or APD 104 is used.

Because application 210 operates in a single shared memory address space 240, the conventional need for multiple representations of addresses is removed. In an embodiment, shared memory address space 240 is referenced by a full 64 bit virtual address. In another embodiment, shared memory address space 240 is internally limited to 48 bits, e.g. sign extended to 64 bits from bit 47, in the same manner as a x86-64 CPU.

The computer arrangement described herein uses different memory heaps. One approach to accessing the above-noted memory heaps is to use memory instruction mapper 250 to map to the memory heaps with shared memory address space 240. Memory heaps mapped into shared memory address space 240 by embodiments, can be accessed by memory instruction 220.

In an embodiment, memory instruction mapper 250 uses IOMMU 116 to access physical memory resources. As described in FIG. 1A above, IOMMU 116 includes logic to perform virtual to physical address translation for memory page access for devices including APD 104. One approach used by IOMMU 116 to enable the use of shared memory address space 240, uses full x86 page tables to allow x86 user code and APD code to share the same memory page tables. Because of this page table sharing, in an embodiment, an APD context corresponds to standard x86 user context. Using the IOMMU 116, each APD context participates fully in paging translations and protections. APD 104 is enabled to use standard TLB translation caching techniques. Because of this expanded use of page tables by embodiments, OS 108 may be required to propagate page invalidations and page table flushes to IOMMU 116.

Memory instruction mapper 250 maps memory instruction 220 that references shared address in shared memory address space 240 into either physical memory of CPU 102 or APD 104. As would also be appreciated by one having skill in the relevant art(s), given the description herein, physical memory of CPU 102 or APD 104 are represented by memory heaps that are accessible by a unique shared address in shared memory address space 240. Memory heaps that are accessible by unique shared address in shared memory address space 240, allow pointers to be passed directly between CPU 102 and APD 104 without modification. Memory heaps that are accessible by unique shared address in shared memory address space 240 allow all pointers to be stored in generic pointer containers native to a given language, e.g. void in C++.

As would be appreciated by one having skill in the relevant art(s), given the description herein, not all memory heaps are accessible by CPU 102 and APD 104. In an embodiment, if CPU 102 attempts to reference an inaccessible memory heap using a mapped address in shared memory address space 240, CPU 102 is required to take a protection fault. Because, in an embodiment, not all memory heaps are accessible to CPU 102 and APD 104, library calls can be supplied to guide and control memory placement. In another embodiment, application 210 is prevented from accessing memory allocated to only APD 104 from CPU 102. Similarly, in yet another embodiment, application 210 is prevented from accessing memory allocated to only CPU 102 from APD 104.

Physical memory in CPU 102 or APD 104 executes memory instruction 220 based memory selector 320 that determines which physical memory will execute memory instruction 220. Memory instruction 220 is mapped based on that selection by memory instruction mapper 250 into and executed by virtual memory heaps located in CPU 102 or APD 104.

G1. Local Data Store: As shown in Table 1 below, a local data store memory heap is a private memory region accessible only by APD 104. Local data store is private to a work-group. The memory size allocated to local data store varies on an application basis. Load data store is pinned memory.

G2. Global Data Store: As shown in Table 1 below, a global data store memory heap is a shared memory region accessible only by APD 104. Global data store is private to application 210. The memory size allocated to global data store varies on an application basis. Global data store is pinned.

G3. Scratch Memory: As shown in Table 1 below, a scratch memory heap is accessible by APD 104. Scratch memory can be used as a per work-item extension to APD general purpose registers. Addresses in a scratch aperture undergo a transformation of their virtual addresses such that each location in the virtual address space is replicated and private to the work-item. The resultant address maps to an APD local memory, APD coherent memory or system coherent memory.

G4. APD Local Memory: As shown in Table 1 below, this memory heap is exclusively accessible by APD 104 and mapped using APD internal virtual memory hardware. In different implementations, portions of APD 104 can be mapped to APD DRAM or to unsnooped system Memory. The x86 page table entries corresponding to APD local memory addresses are marked as not present.

G5. System Coherent Memory: As shown in Table 1 below, the system coherent memory heap is accessible by both CPU 102 and APD and is located in memory connected to the CPU 102 memory controller. In different implementations, the system coherent memory heap maps into shared memory address space 240 using x86 page tables, is not required to be pinned, and can generate memory page faults. In an implementation, OS memory manager 153 manages memory allocation and page faults for the system coherent memory heap.

G6. APD Coherent Memory: As shown in Table 1 below this memory heap is accessible by both CPU 102 and APD 104. The APD coherent memory heap is not required to be pinned and can generate memory page faults. In implementations, APD coherent memory is located in APD 104. x86 page tables are not placed in APD 104 coherent memory.

TABLE 1

| Heap Type | Allocator | CPU Visible | APD Visible |
|---|---|---|---|
| APD Local | Kernel Mode Driver | No | Yes |
| APD Coherent | Kernel Mode Driver | Yes | Yes |

TABLE 1-continued

| Heap Type | Allocator | CPU Visible | APD Visible |
|---|---|---|---|
| Scratch | Graphics Driver | No | Yes |
| System Coherent Memory | Operating System Memory Manager | Yes | Yes |
| Global Data Store | Graphics Driver | No | Yes |
| Local Data Store | Graphics Driver | No | Yes |

Example memory heaps G1-G6 detailed above are intended to be a non-limiting illustration of different implementation characteristics. As would be appreciated by one having skill in the relevant art(s), given the description herein, without departing from the spirit of embodiments herein any characteristic noted above can be beneficially varied based on implementation-specific factors. Additional memory heap structures may also be used by embodiments.

Figure 3:
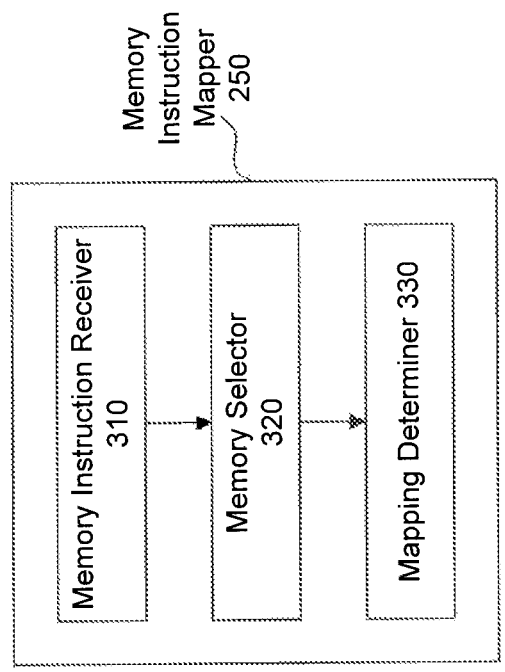
FIG. 3 is a more detailed view of a memory instruction mapper according to an embodiment of the present invention.

FIG. 3 depicts a more detailed view of memory instruction mapper 250, according to an embodiment. Memory instruction mapper 250 includes a memory instruction receiver 310, a memory selector 320 and a mapping determiner 330. In an embodiment, memory instruction receiver 310 is configured to receive memory instruction 220, and memory selector 320 is configured to select a physical memory resource based on the shared memory address referenced by memory instruction 220. Mapping determiner 330 is configured to determine how memory instruction 220 is to be mapped to the selected physical memory resource.

Figure 4:
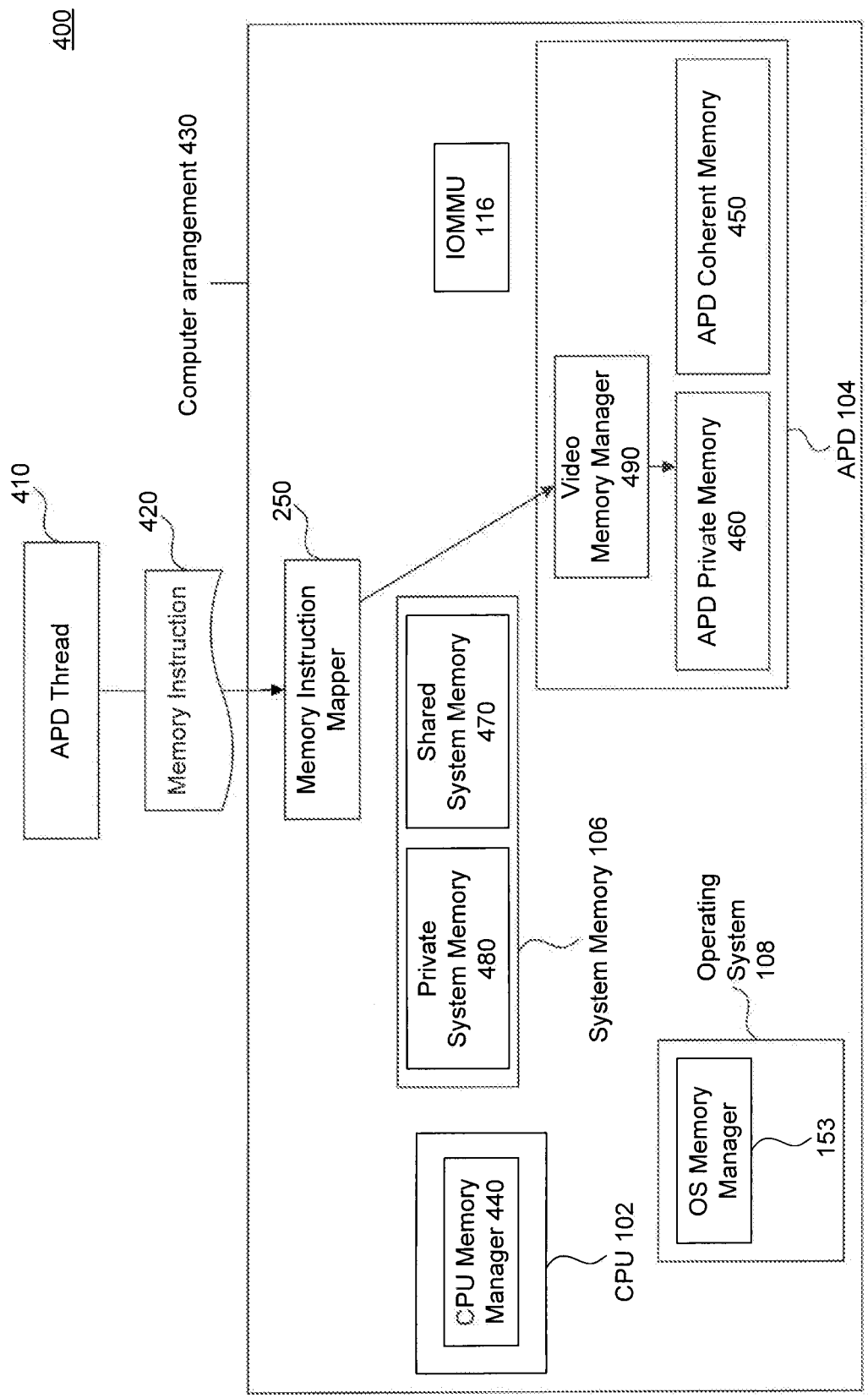
FIG. 4 depicts a system of mapping a memory instruction into an APD private memory using a memory instruction mapper and a shared memory address space, according to an embodiment of the present invention.
Figure 5:
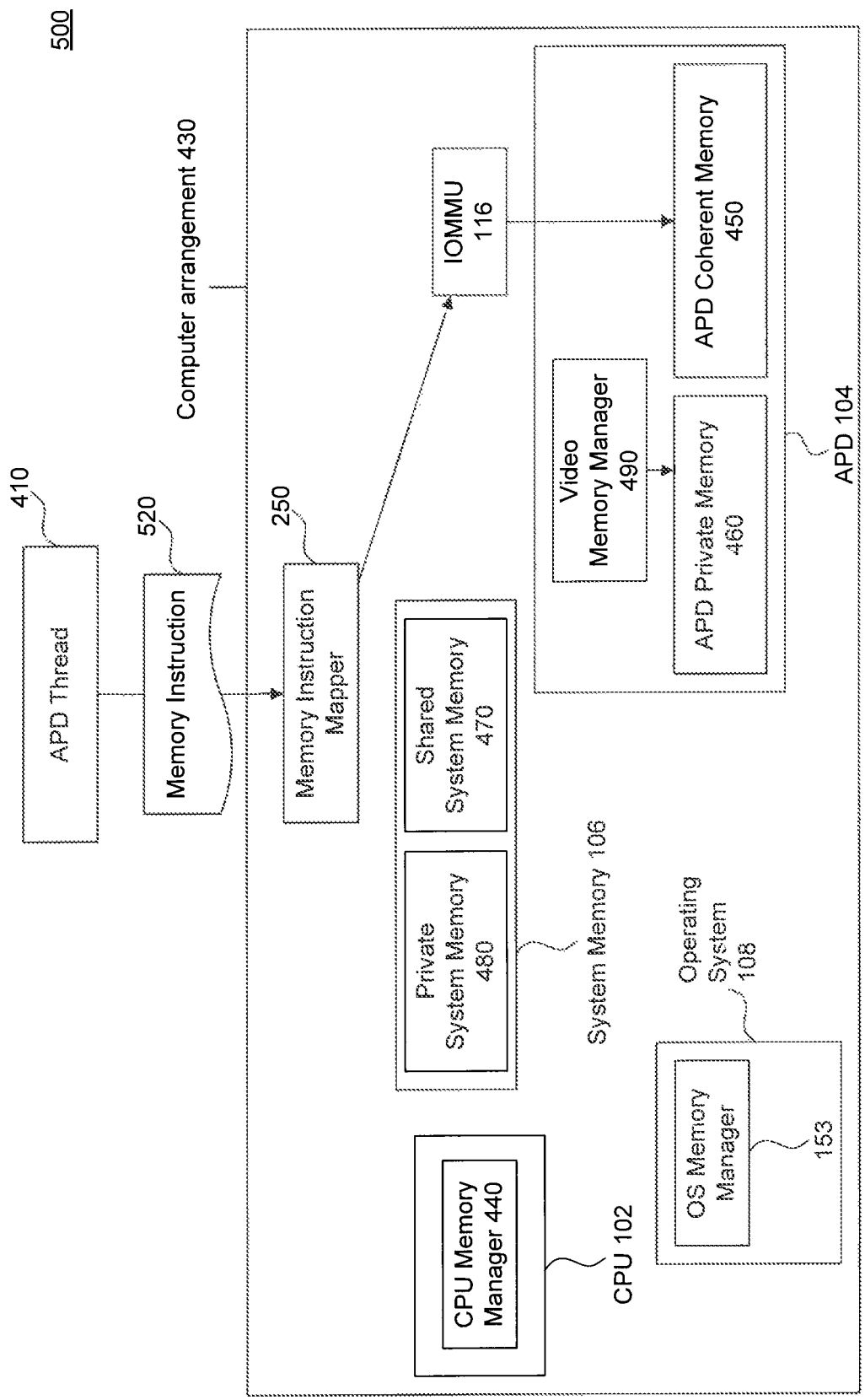
FIG. 5 depicts a system of mapping a memory instruction into an APD coherent memory using a memory instruction mapper and a shared memory address space, according to an embodiment of the present invention.
Figure 6:
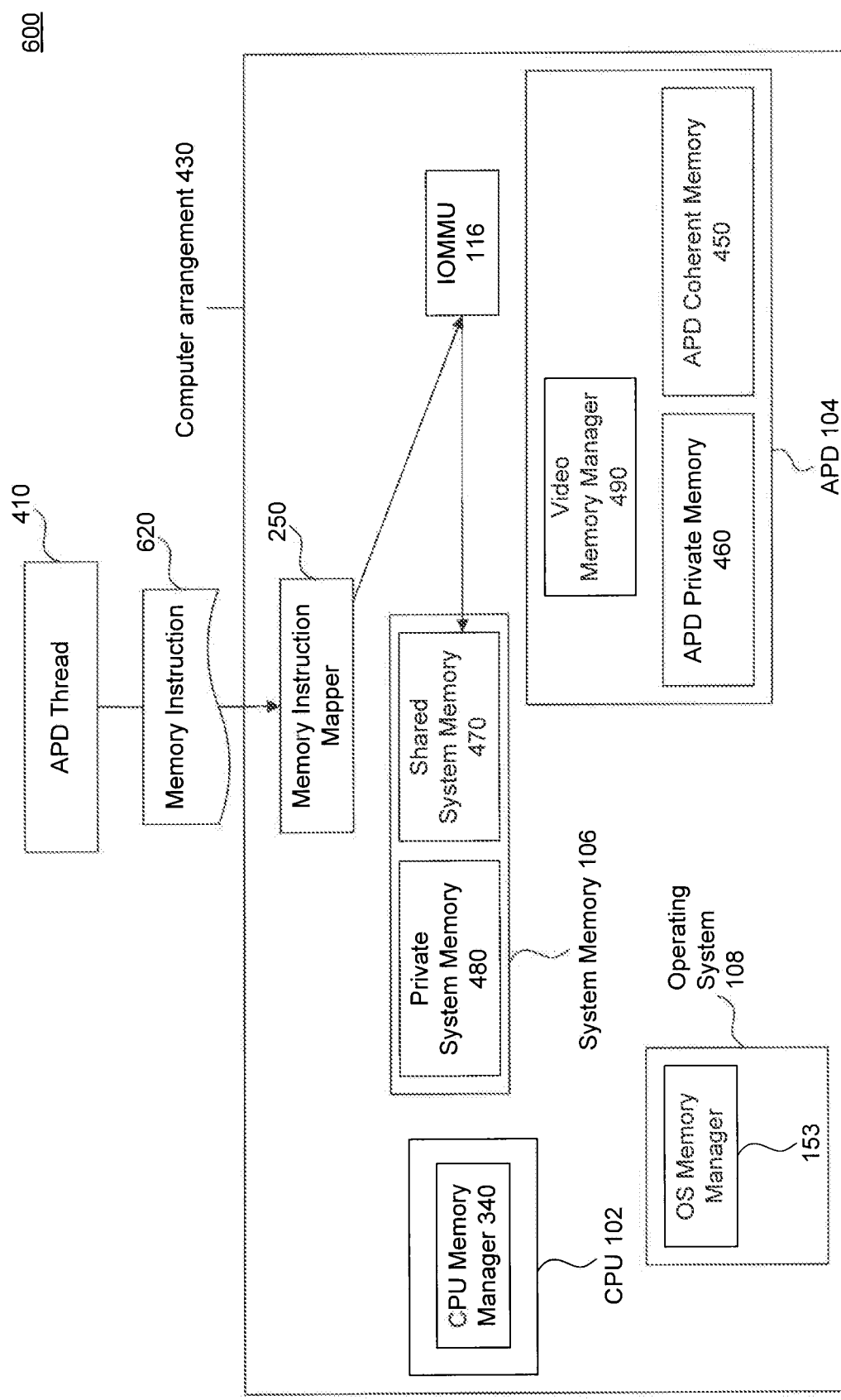
FIG. 6 depicts a system of mapping a memory instruction into a system shared memory using a memory instruction mapper and a shared memory address space, according to an embodiment of the present invention.
Figure 7:
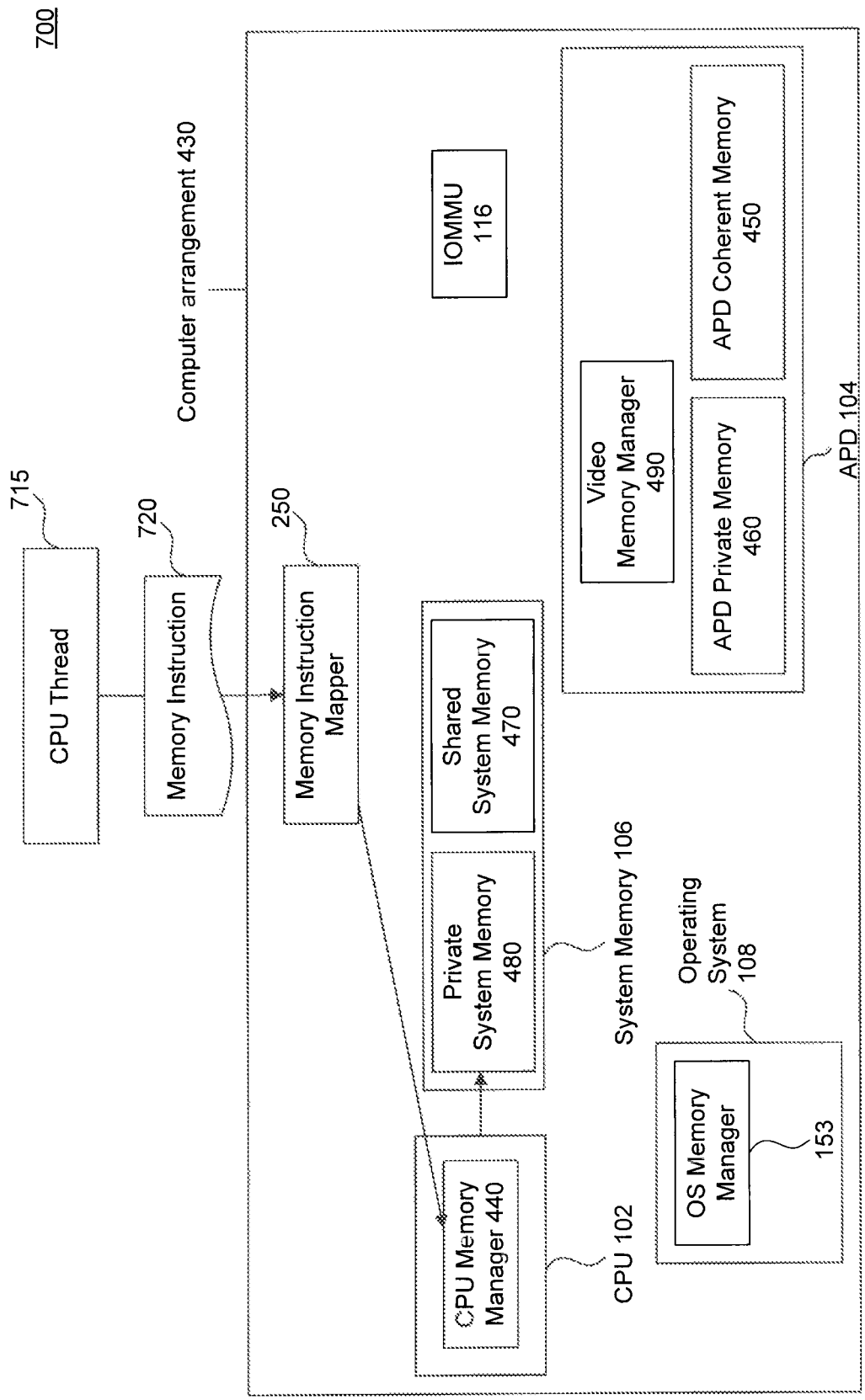
FIG. 7 depicts a system of mapping a CPU thread memory instruction into a system private memory using a memory instruction mapper and a shared memory address space, according to an embodiment of the present invention.
Figure 8:
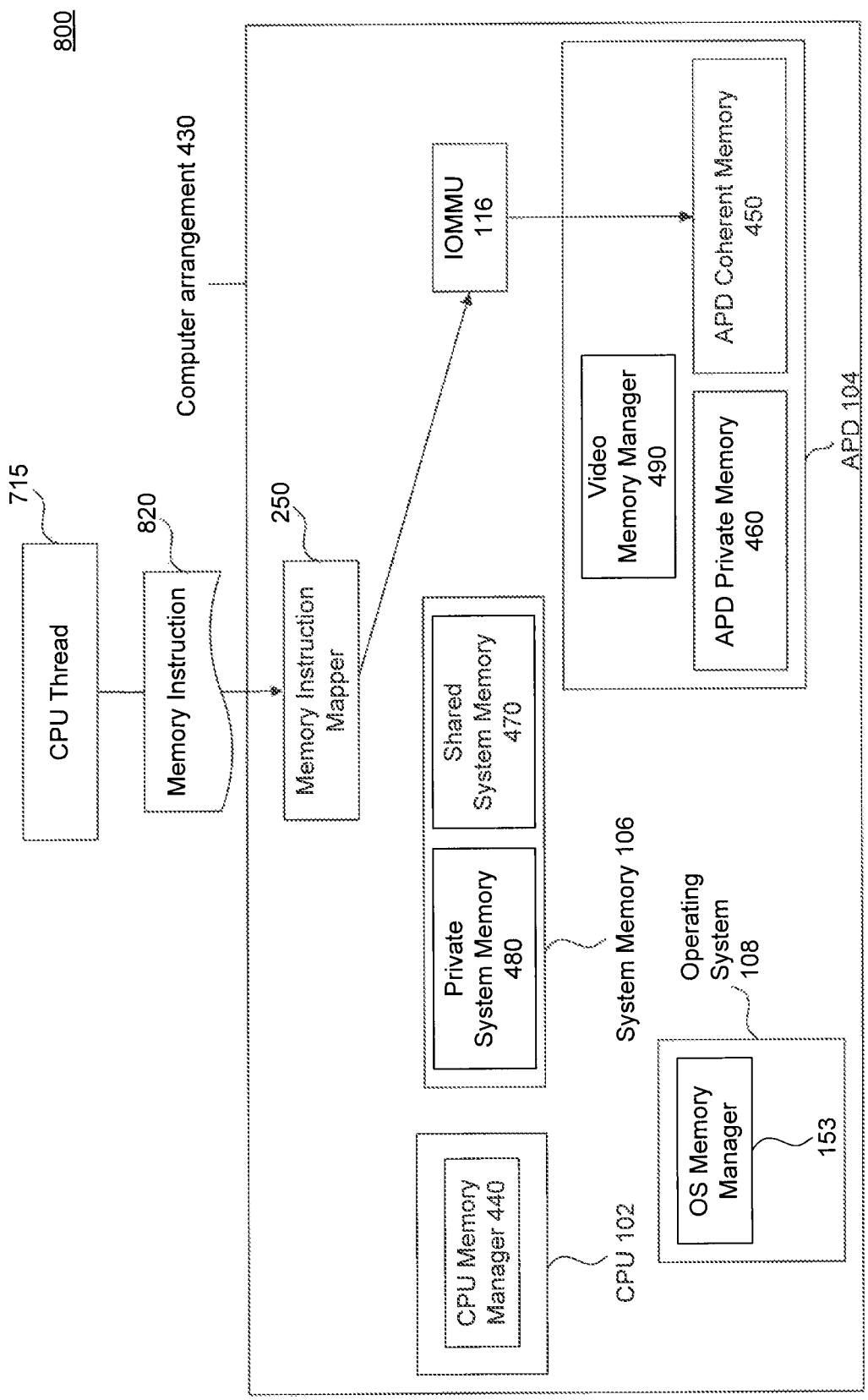
FIG. 8 depicts a system of mapping a CPU thread memory instruction into a shared system memory using a memory instruction mapper and a shared memory address space, according to an embodiment of the present invention.

As discussed with the descriptions of FIGS. 4-8 below, different approaches may be used for the mapping of memory instruction 220 to available physical memory resources. In FIG. 4 for example, memory instruction 220, originating in an APD thread, is mapped to an APD private memory using a video memory manager. In FIG. 5 for example, memory instruction 220, originating in an APD thread, is mapped to APD coherent memory using the IOMMU described above. In FIG. 6, memory instruction 220, originating in an APD thread, is mapped to shared system memory using the IOMMU. In FIG. 7, memory instruction 220, originating in a CPU thread, is mapped to private system memory using a CPU memory manager. FIG. 8 memory instruction 220, originating in a CPU thread, is mapped to shared system memory using the IOMMU.

FIG. 4 depicts a system 400, such system mapping memory instruction 420 to APD private memory 460 using memory instruction mapper 250 and shared memory address space 240, according to an embodiment of the present invention.

System 400 includes APD thread 410 relaying memory instruction 420 to computer arrangement 430. Computer arrangement 430 includes memory instruction mapper 250, CPU 102, system memory 106, APD 104, IOMMU 116 and OS 108. CPU 102 includes CPU memory manager 440, system memory 106 includes private system memory 480 and shared system memory 470 and APD 104 includes video memory manager 490, APD private memory 460 and APD coherent memory 450.

Memory instruction 420 originates with APD thread 410, and contains an address reference to shared memory address space 240. Memory instruction mapper 250 uses the included address reference to map memory instruction 420 to APD private memory 460. As described above, the particular shared memory address referenced by memory instruction 420 is used by memory instruction mapper 250, to direct the execution of memory instruction 420 to a particular physical memory address accessible by computer arrangement 430.

Referring to FIGS. 2, 3 and 4, based on the address referenced by memory instruction 420 in shared memory address space 240, memory selector 320 selects APD private memory 460 for the execution of memory instruction 420. Mapping determiner 330 maps the memory instruction 420 to a physical memory resource based on the reference to shared memory address space 240.

In an example, address range 4 to 8 in shared memory address space 240 is defined as the portion of the shared memory address space 240 allocated to APD private memory 460. Memory instruction 420 refers to address 6. Memory instruction 420 thus references an address in the above defined shared memory address space 240 that is allocated to APD private memory 460, and memory instruction mapper 250 maps memory instruction 420 to that memory resource.

As further depicted on FIG. 4, one approach used to map to APD private memory 460 is to refer memory instruction 420 to video memory manager 490. In an embodiment, memory instruction mapper 250 has specific memory access pathways defined and mapping determiner 330 uses such pathways to direct memory instructions from particular thread types to particular memory managers and to particular physical memory resources.

In the illustrative example depicted on FIG. 4, the use of video memory manager 490 is determined by memory instruction mapper 250 based on the shared memory address reference in memory instruction 420. In another embodiment, video memory manager 490 is directed, by memory instruction mapper 250 to access APD private memory 460. In yet another embodiment, video memory manager 490 receives memory instruction 420 based on memory instruction mapper 250, and then selects APD private memory 460 based on other criteria, e.g., the shared memory address, the originating thread or the type of memory instruction.

For FIGS. 4-8, it should be appreciated that, though memory instruction mapper 250 is depicted in a pathway from originating threads 410 and 715 to the memory mapping destinations, e.g., APD 460, memory instruction mapper 250 can be used as a reference component that directs each thread to directly access the physical memory resources. In an example (not shown), APD thread 410, having memory instruction 420, can inquire directly to memory instruction mapper 250 to request a mapping path for memory instruction 420 memory access. Receiving the shared memory address reference from APD thread 410, memory instruction mapper 250 performs the above described mapping function and responds, directing APD thread 410 to use video memory manager 490 and APD private memory 460.

Adding further detail to the example depicted in FIG. 4, APD thread 410 is a graphics-based application thread originated by a graphics application (not shown). Memory instruction 420 is a graphics based instruction, and the address that memory instruction 420 refers to in shared memory address space 240 defines an address in shared memory address space 240 that is to be executed by APD private memory 460.

FIG. 5 depicts a system 500, such system mapping memory instruction 520 to APD coherent memory 450 using memory instruction mapper 250 and shared memory address space 240, according to an embodiment of the present invention. APD thread 410 relays memory instruction 520 to computer arrangement 430. Computer arrangement 430 includes memory instruction mapper 250, CPU 102, system memory 106, APD 104, IOMMU 116 and OS 108. CPU 102 includes CPU memory manager 440, system memory 106 includes private system memory 480 and shared system memory 470 and APD 104 includes video memory manager 490, APD private memory 460 and APD coherent memory 450.

Memory instruction 520 originates with APD thread 410, and contains an address reference to shared memory address space 240. Memory instruction mapper 250 uses the included address reference to map memory instruction 520 to APD coherent memory 450. As described above, the particular shared memory address referenced by memory instruction 520 is used by memory instruction mapper 250, to direct the execution of memory instruction 520 to a particular physical memory address accessible by computer arrangement 430.

Referring to FIGS. 2, 3 and 5, based on the address referenced by memory instruction 520 in shared memory address space 240, memory selector 320 selects APD coherent memory 450 for the execution of memory instruction 520. Mapping determiner 330 maps the memory instruction 520 to a physical memory resource based on the reference to shared memory address space 240.

In an example, address range 9 to 12 in shared memory address space 240 is defined as the portion of the shared memory address space 240 allocated to APD coherent memory 450. Memory instruction 520 refers to address 10. Memory instruction 520 thus references an address in the above defined shared memory address space 240 that is allocated to APD coherent memory 450, and memory instruction mapper 250 maps memory instruction 520 to that memory resource.

As further depicted on FIG. 5, one approach used to map to APD coherent memory 450 is to refer memory instruction 520 to IOMMU 116. As noted above, with the description of FIG. 4, in embodiments, memory instruction mapper 250 has specific memory access pathways defined and mapping determiner 330 uses such pathways to direct memory instructions from particular thread types to particular memory managers and to particular physical memory resources.

In the illustrative example depicted on FIG. 5, the use of IOMMU 116 is determined by memory instruction mapper 250 based on the shared memory address reference in memory instruction 520. In another embodiment, IOMMU 116 is directed, by memory instruction mapper 250 to map memory instruction 520 to APD coherent memory 450. In yet another embodiment, IOMMU 116 receives memory instruction 520 based on memory instruction mapper 250, and then selects APD coherent memory 450 based on other criteria, e.g., the shared memory address, the originating thread or the type of memory instruction.

Memory instruction 520 may be a conventional instruction, e.g., an x86 instruction, which can be executed using either a CPU thread or an APD thread. Because the instruction can be executed by either type of thread, the shared memory address reference that memory instruction 520 refers to an address in shared memory address space 240 that enables the alternative use of multiple physical memory resources.

In this example, the shared address reference defines an address in shared memory address space 240 that enables the use of either APD coherent memory 450 or shared system memory 470. As noted above, APD coherent memory 450 is a shared memory in APD 104 that can be accessed by both APD 104 and CPU 102, and shared system memory 470 is a shared memory in system memory 106 that can be accessed by both APD 104 and CPU 102. In an embodiment, IOMMU 116 is configured to select from the available memory resources based on different criteria.

Based on the address referenced by memory instruction 520, in this example, memory selector 320 selects IOMMU 116 to determine whether APD coherent memory 450 or shared system memory 470 should be provided to memory instruction 520. In an embodiment, IOMMU 116 selects APD coherent memory 450 to execute memory instruction 520. In an embodiment, IOMMU 116 selects from available memory resources using the shared address reference, while in other embodiments, different criteria are used, e.g., performance enhancement.

In yet another embodiment, OS memory manager 153 manages IOMMU 116 to ensure IOMMU 116 maps the page tables for memory instruction 520 properly and ensures that CPU 102 and APD 104 recognize the mappings. Additional detail describing the operation of IOMMU is provided in the IOMMU Applications noted above.

FIG. 6 depicts a system 600, such system mapping memory instruction 620 to shared system memory 470 using memory instruction mapper 250 and shared memory address space 240, according to an embodiment of the present invention.

System 600 includes APD thread 410 relaying memory instruction 620 to computer arrangement 430. Computer arrangement 430 includes memory instruction mapper 250, CPU 102, system memory 106, APD 104, IOMMU 116 and OS 108. CPU 102 includes CPU memory manager 440, system memory 106 includes private system memory 480 and shared system memory 470 and APD 104 includes video memory manager 490, APD private memory 460 and APD coherent memory 450.

Memory instruction 620 originates with APD thread 410, and contains an address reference to shared memory address space 240. Memory instruction mapper 250 uses the included address reference to map memory instruction 620 to shared system memory 470. As described above, the particular shared memory address referenced by memory instruction 620 is used by memory instruction mapper 250, to direct the execution of memory instruction 620 to a particular physical memory address accessible by computer arrangement 430.

Referring to FIGS. 2, 3 and 6, based on the address referenced by memory instruction 620 in shared memory address space 240, memory selector 320 selects shared system memory 470 for the execution of memory instruction 620. Mapping determiner 330 maps the memory instruction 620 to a physical memory resource based on the reference to shared memory address space 240.

In an example, address range 13 to 20 in shared memory address space 240 is defined as the portion of the shared memory address space 240 allocated to shared system memory 470. Memory instruction 620 refers to address 15. Memory instruction 620 thus references an address in the above defined shared memory address space 240 that is allocated to shared system memory 470, and memory instruction mapper 250 maps memory instruction 620 to that memory resource.

As further depicted on FIG. 6, one approach used to map to shared system memory 470 is to refer memory instruction 620 to IOMMU 116. As noted above, with the description of FIGS. 4 and 5, in embodiments, memory instruction mapper 250 has specific memory access pathways defined and mapping determiner 330 uses such pathways to direct memory instructions from particular thread types to particular memory managers and to particular physical memory resources.

In the illustrative example depicted on FIG. 6, the use of IOMMU 116 is determined by memory instruction mapper 250 based on the shared memory address reference in memory instruction 620. In another embodiment, IOMMU 116 is directed, by memory instruction mapper 250 to map memory instruction 620 to shared system memory 470. In yet another embodiment, IOMMU 116 receives memory instruction 620 based on memory instruction mapper 250, and then selects shared system memory 470 based on other criteria, e.g., the shared memory address, the originating thread or the type of memory instruction. As noted above with the description of FIG. 5, an example of the operation and functions of an IOMMU 116 operating within a similar computer arrangement can be found in the IOMMU Applications.

Adding further detail to the example depicted in FIG. 6, memory instruction 620 is a conventional instruction, e.g., an x86 instruction, which can be executed using either a CPU thread or an APD thread. Because the instruction can be executed by either type of thread, the shared memory address reference that memory instruction 620 refers to an address in shared memory address space 240 that enables the alternative use of multiple physical memory resources.

In this example, the shared address reference defines an address in shared memory address space 240 that enables the use of either APD coherent memory 450 or shared system memory 470. As noted above, APD coherent memory 450 is a shared memory in APD 104 that can be accessed by both APD 104 and CPU 102, and shared system memory 470 is a shared memory in system memory 106 that can be accessed by both APD 104 and CPU 102. In an embodiment, IOMMU 116 is configured to select from the available memory resources based on different criteria.

Based on the address referenced by memory instruction 620, in this example, memory selector 320 selects IOMMU 116 to determine whether APD coherent memory 450 or shared system memory 470 should be provided to memory instruction 620. In an embodiment, IOMMU 116 selects APD coherent memory 450 to execute memory instruction 620. In an embodiment, IOMMU 116 selects from available memory resources using the shared address reference, while in other embodiments, different criteria are used, e.g., performance enhancement.

In yet another embodiment, OS memory manager 153 manages IOMMU 116 to ensure IOMMU 116 maps the page tables for memory instruction 620 properly and ensures that CPU 102 and APD 104 recognize the mappings. Additional detail describing the operation of IOMMU 116 is provided in the IOMMU Applications noted above.

FIG. 7 depicts a system 700, such system mapping memory instruction 720 to private system memory 480 using memory instruction mapper 250 and shared memory address space 240, according to an embodiment of the present invention.

System 700 includes CPU thread 715 relaying memory instruction 720 to computer arrangement 430. Computer arrangement 430 includes memory instruction mapper 250, CPU 102, system memory 106, APD 104, IOMMU 116 and OS 108. CPU 102 includes CPU memory manager 440, system memory 106 includes private system memory 480 and shared system memory 470, and APD 104 includes video memory manager 490, APD private memory 460 and APD coherent memory 450.

Memory instruction 720 originates with CPU thread 715, and contains an address reference to shared memory address space 240. Memory instruction mapper 250 uses the included address reference to map memory instruction 720 to private system memory 480. As described above, the particular shared memory address referenced by memory instruction 720 is used by memory instruction mapper 250, to direct the execution of memory instruction 720 to a particular physical memory address accessible by computer arrangement 430.

Referring to FIGS. 2, 3 and 7, based on the address referenced by memory instruction 720 in shared memory address space 240, memory selector 320 selects private system memory 480 for the execution of memory instruction 720.

Mapping determiner 330 maps the memory instruction 720 to a physical memory resource based on the reference to shared memory address space 240.

In an example, address range 21 to 30 in shared memory address space 240 is defined as the portion of the shared memory address space 240 allocated to private system memory 480. Memory instruction 720 refers to address 25. Memory instruction 720 thus references an address in the above defined shared memory address space 240 that is allocated to private system memory 480, and memory instruction mapper 250 maps memory instruction 720 to that memory resource.

As further depicted on FIG. 7, one approach used to map to private system memory 480 is to refer memory instruction 720 to CPU memory manager 440. As noted above, with the description of FIGS. 4-6, in embodiments, memory instruction mapper 250 has specific memory access pathways defined and mapping determiner 330 uses such pathways to direct memory instructions from particular thread types to particular memory managers and to particular physical memory resources.

In the illustrative example depicted on FIG. 7, the use of CPU memory manager 440 is determined by memory instruction mapper 250 based on the shared memory address reference in memory instruction 720. In another embodiment, CPU memory manager 440 is directed, by memory instruction mapper 250 to map memory instruction 720 to private system memory 480. In yet another embodiment, CPU memory manager 440 receives memory instruction 720 based on memory instruction mapper 250, and then selects private system memory 480 based on other criteria, e.g., the shared memory address, the originating thread or the type of memory instruction.

Memory instruction 720 is a conventional instruction, e.g., an x86 instruction, which using computer arrangement 230, requires access to private system memory 480. The address that memory instruction 720 refers to in shared memory address space 240 defines an address in shared memory address space 240 maps to private system memory 480. As noted above with the description of memory heaps, private system memory 480 is a private memory accessible only to CPU 102.

In an embodiment, CPU device driver allocates a piece of private system memory 480 to execute memory instruction 720 at a specific address. CPU device driver sends a request to OS memory manager 153 as described in FIG. 1A to execute the allocation. OS memory manager 153 determines the shared address to tag to memory instruction 720. OS memory manager 153 manages CPU memory manager 440 to ensure CPU memory manager 440 maps the page tables for memory instruction 720 properly and ensures that CPU 102 and APD 104 recognize the mappings.

FIG. 8 depicts a system 800, such system mapping memory instruction 820 to APD coherent memory 450 using memory instruction mapper 250 and shared memory address space 240, according to an embodiment of the present invention.

System 800 includes CPU thread 715 relaying memory instruction 820 to computer arrangement 430. Computer arrangement 430 includes memory instruction mapper 250, CPU 102, system memory 106, APD 104, IOMMU 116 and OS 108. CPU 102 includes CPU memory manager 440, system memory 106 includes private system memory 480 and shared system memory 470 and APD 104 includes video memory manager 490, APD private memory 460 and APD coherent memory 450.

Memory instruction 820 originates with CPU thread 715, and contains an address reference to shared memory address space 240. Memory instruction mapper 250 uses the included address reference to map memory instruction 820 to APD coherent memory 450. As described above, the particular shared memory address referenced by memory instruction 820 is used by memory instruction mapper 250, to direct the execution of memory instruction 820 to a particular physical memory address accessible by computer arrangement 430.

Referring to FIGS. 2, 3 and 8, based on the address referenced by memory instruction 820 in shared memory address space 240, memory selector 320 selects APD coherent memory 450 for the execution of memory instruction 820. Mapping determiner 330 maps the memory instruction 820 to a physical memory resource based on the reference to shared memory address space 240.

As noted with the example described with FIG. 5, address range 9 to 12 in shared memory address space 240 is defined as the portion of the shared memory address space 240 allocated to APD coherent memory 450. Memory instruction 820 refers to address 10. Memory instruction 820 thus references an address in the above defined shared memory address space 240 that is allocated to APD coherent memory 450, and memory instruction mapper 250 maps memory instruction 820 to that memory resource.

In contrast to the example detailed with the description of FIG. 5, where memory instruction 520 originates with APD thread 410, in FIG. 8, memory instruction 820 originates with CPU thread 715. It should be noted that the two different types of threads are able to refer to the same shared memory address space and utilize the same memory resources, without the conventional copying and transferring approaches described above.

As further depicted on FIG. 8, as with FIG. 5, one approach used to map to APD coherent memory 450 is to refer memory instruction 820 to IOMMU 116. As noted above, with the description of FIGS. 4-7, in embodiments, memory instruction mapper 250 has specific memory access pathways defined and mapping determiner 330 uses such pathways to direct memory instructions from particular thread types to particular memory managers and to particular physical memory resources.

In the illustrative example depicted on FIG. 8, the use of IOMMU 116 is determined by memory instruction mapper 250 based on the shared memory address reference in memory instruction 820. In another embodiment, IOMMU 116 is directed, by memory instruction mapper 250 to map memory instruction 820 to APD coherent memory 450. In yet another embodiment, IOMMU 116 receives memory instruction 820 based on memory instruction mapper 250, and then selects APD coherent memory 450 based on other criteria, e.g., the shared memory address, the originating thread or the type of memory instruction. As noted above with the description of FIGS. 5 and 6, an example of the operation and functions of an IOMMU 116 operating within a similar computer arrangement can be found in the IOMMU Applications.

Adding further detail to the example depicted in FIG. 8, memory instruction 820 is a conventional instruction, e.g., an x86 instruction, which can be executed using either a CPU thread or an APD thread. Because the instruction can be executed by either type of thread, the shared memory address reference that memory instruction 820 refers to an address in shared memory address space 240 that enables the alternative use of multiple physical memory resources.

In this example, the shared address reference defines an address in shared memory address space 240 that enables the use of either APD coherent memory 450 or shared system memory 470. As noted above, APD coherent memory 450 is a shared memory in APD 104 that can be accessed by both APD 104 and CPU 102, and shared system memory 470 is a shared memory in system memory 106 that can be accessed by both APD 104 and CPU 102. In an embodiment, IOMMU 116 is configured to select from the available memory resources based on different criteria.

Based on the address referenced by memory instruction 820, in this example, memory selector 320 selects IOMMU 116 to determine whether APD coherent memory 450 or shared system memory 470 should be provided to memory instruction 820. In an embodiment, IOMMU 116 selects APD coherent memory 450 to execute memory instruction 820. In an embodiment, IOMMU 116 selects from available memory resources using the shared address reference, while in other embodiments, different criteria are used, e.g., performance enhancement.

In yet another embodiment, OS memory manager 153 manages IOMMU 116 to ensure IOMMU 116 maps the page tables for memory instruction 820 properly and ensures that CPU 102 and APD 104 recognize the mappings. Additional detail describing the operation of IOMMU 116 is provided in the IOMMU Applications noted above.

Figure 9:
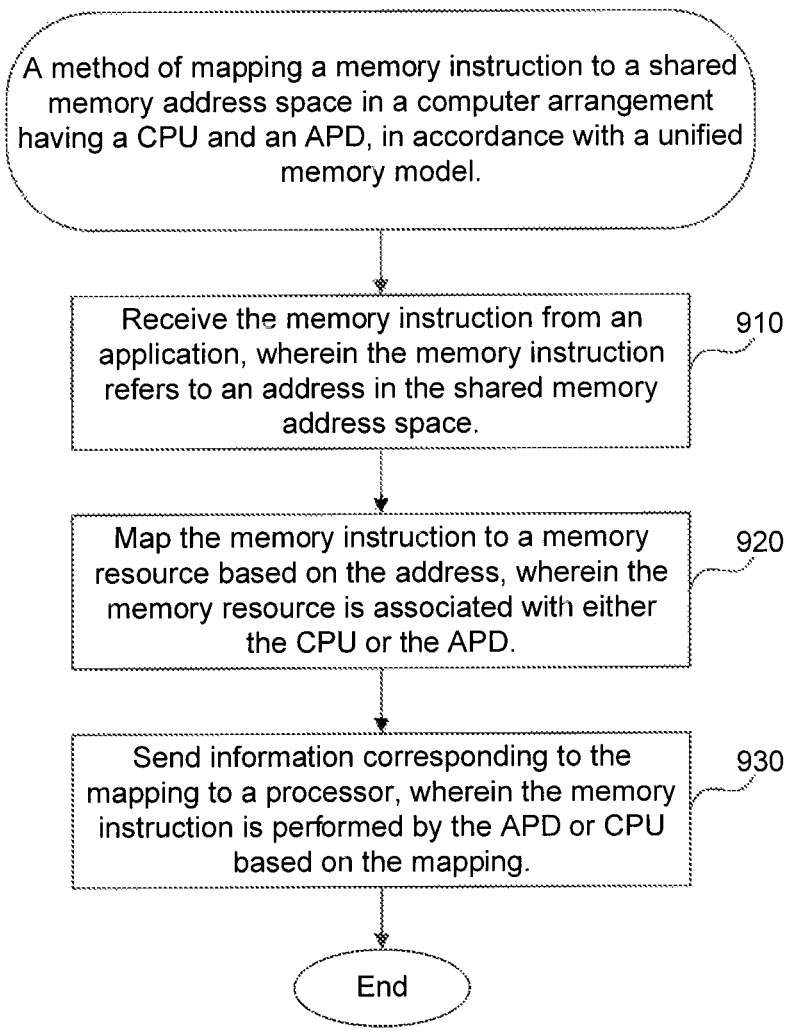
FIG. 9 shows a flowchart illustrating a method of performing a memory instruction in a computer arrangement with a CPU and an APD accessing a shared memory address space in accordance with a unified memory model, according to an embodiment of the present invention.

This section and FIG. 9 summarizes one of the techniques described herein by presenting a flowchart of an exemplary method 900 of mapping a memory instruction to a shared memory space in a computer arrangement having a CPU and an APD in accordance with a unified memory model. While method 900 is described with respect to an embodiment of the present invention, method 900 is not meant to be limiting and may be used in other applications.

As shown in FIG. 9, an embodiment of method 900 begins at step 910 where the memory instruction that refers to an address in the shared memory space is received from an application. In an embodiment, as shown in FIGS. 2 and 3, a memory instruction receiver, such as memory instruction receiver 310 receives the memory instruction, such as memory instruction 220, that refers to an address in the shared memory space, from an application, such as application 210. Once step 910 is complete, method 900 proceeds to step 920.

At step 920, the memory instruction is mapped based on the address to a memory resource that is associated with either the CPU or the APD. In an embodiment, as shown in FIGS. 2 and 3, a memory instruction mapper, such as memory instruction mapper 250, maps the memory instruction, such as memory instruction 220, based on the address to a memory resource, such as CPU physical memory 270 or APD physical memory 280. Once step 920 is complete, method 900 proceeds to step 930.

At step 930, information is sent corresponding to the mapping to a processor where the memory instruction is performed by the processor based on the mapping. In an embodiment, as shown in FIGS. 2 and 3, information is sent corresponding to the mapping by the memory instruction mapper, such as memory instruction mapper 250, to a processor, such as CPU 102 or APD 104, where the memory instruction, such as memory instruction 220 is performed by the processor, such as CPU 102 or APD 104 based on the mapping. Once step 930 is completed, method 900 ends.

Embodiments described herein relate to the mapping of memory instructions in a shared memory address space. The summary and abstract sections may set forth one or more but not all exemplary embodiments of the present invention as contemplated by the inventors, and thus, are not intended to limit the present invention and the claims in any way.

The embodiments herein have been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

The foregoing description of the specific embodiments will so fully reveal the general nature of the present invention that others may, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the claims and their equivalents.

What is claimed is:

1. A method of mapping a memory instruction to a shared memory address space in a computer arrangement configured for unified operation between a central processing unit (CPU) and an accelerated processing device (APD), comprising:
receiving the memory instruction, wherein the memory instruction refers to an address in the shared memory address space;
mapping the memory instruction to a memory resource based on the address, wherein the memory resource is associated with at least one of the CPU and the APD; and
sending information corresponding to the mapping to the CPU or APD.

2. The method of claim 1, wherein the memory instruction is received from the APD.

3. The method of claim 2, wherein when the mapping maps to a private memory resource associated with the APD, the mapping comprises, using a video memory manager to map the memory instruction to the private memory resource.

4. The method of claim 2, wherein when the mapping maps to a shared memory resource associated with the APD, the mapping comprises using a system memory manager to map the memory instruction to the shared memory resource, wherein the shared memory resource is accessible by both the CPU and the APD.

5. The method of claim 2, wherein when the mapping maps to a shared memory resource associated with the CPU, the mapping comprises using a system memory manager to map the memory instruction to the shared memory resource, wherein the shared memory resource is accessible by both the CPU and the APD.

6. The method of claim 1, wherein the memory instruction is received from a CPU.

7. The method of claim 6, wherein when the mapping maps to a shared memory resource associated with the APD, the mapping comprises using a system memory manager to map the memory instruction to the shared memory resource, wherein the shared memory resource is accessible by both the CPU and APD.

8. The method of claim 6, wherein when the mapping maps to a private memory resource associated with the CPU, the mapping comprises using a CPU memory manager to map the memory instruction to the private memory resource, wherein the private memory resource is not accessible by the APD.

9. The method of claim 1, wherein the CPU and APD both perform instructions in an application.

10. The method of claim 5, wherein an operating system memory manager manages the CPU memory manager and the system memory manager.

11. A system for mapping a memory instruction to a shared memory address space in a computer arrangement configured for unified operation between a central processing unit (CPU) or an accelerated processing device (APD), comprising:
- a memory instruction receiver, configured to receive the memory instruction, the memory instruction referring to an address in the shared memory address space;
- a memory selector configured to select a memory resource based on the address, wherein the memory resource is associated with the CPU or the APD; and
- a memory instruction mapper configured to map the memory instruction to the selected memory resource based on the memory instruction, wherein the memory instruction is performed based on the mapping.

12. The system of claim 11, wherein the memory instruction is received from the APD.

13. The system of claim 12, wherein when the selected memory resource is a private memory resource associated with the APD, the mapping comprises, using a video memory manager to map the memory instruction to the private memory resource.

14. The system of claim 12, wherein when the selected memory resource is a shared memory resource associated with the APD, the mapping comprises using a system memory manager to map the memory instruction to the shared memory resource, wherein the shared memory resource is accessible by both the CPU and the APD.

15. The system of claim 12, wherein when the selected memory resource is a shared memory resource associated with the CPU, the mapping comprises using a system memory manager to map the memory instruction to the shared memory resource, wherein the shared memory resource is accessible by both the CPU and the APD.

16. The system of claim 11, wherein the memory instruction is received from the CPU.

17. The system of claim 16, wherein when the selected memory resource is a shared memory resource associated with the APD, the mapping comprises using a system memory manager to map the memory instruction to the shared memory resource, wherein the shared memory resource is accessible by the CPU and the APD.

18. The system of claim 16, wherein when the selected memory resource is a private memory resource associated with the CPU, the mapping comprises using a CPU memory manager to map the memory instruction to the private memory resource, wherein the private memory resource is not accessible by the APD.

19. The system of claim 11, wherein the CPU and APD both perform instructions in an application.

20. The method of claim 14, wherein an operating system memory manager manages the CPU memory manager and the system memory manager.

21. A central processing unit (CPU) configured to map a memory instruction to a shared memory address space, comprising:
- a memory instruction receiver, configured to receive the memory instruction, the memory instruction referring to an address in the shared memory address space;
- a memory selector configured to select a memory resource based on the address, wherein the memory resource is associated with the CPU or an accelerated processing device (APD); and
- a memory instruction mapper configured to map the memory instruction to the selected memory resource based on the memory instruction, wherein the memory instruction is performed based on the mapping.

22. The CPU of claim 21, wherein the memory instruction is received from the APD.

23. The CPU of claim 21, wherein the memory instruction is received from the CPU.

24. An accelerated processing device (APD) configured to map a memory instruction to a shared memory address space, comprising:
- a memory instruction receiver, configured to receive the memory instruction, the memory instruction referring to an address in the shared memory address space;
- a memory selector configured to select a memory resource based on the address, wherein the memory resource is associated with a central processing unit (CPU) or the APD; and
- a memory instruction mapper configured to map the memory instruction to the selected memory resource based on the memory instruction, wherein the memory instruction is performed based on the mapping.

25. The APD of claim 24, wherein the memory instruction is received from the APD.

26. The APD of claim 24, wherein the memory instruction is received from the CPU.

* * * * *